United States Patent [19]

Konak

[11] Patent Number: 4,522,218
[45] Date of Patent: Jun. 11, 1985

[54] METHOD AND APPARATUS FOR SPLITTING TWO-PHASE FLOW AT PIPE TEES

[75] Inventor: A. Riza Konak, Calgary, Canada

[73] Assignee: Exxon Production Research Co., Houston, Tex.

[21] Appl. No.: 536,939

[22] Filed: Sep. 29, 1983

[51] Int. Cl.³ .................. F17D 3/00; G05D 11/02
[52] U.S. Cl. ........................................ 137/3; 137/89; 137/599; 55/55; 55/189; 73/863.03; 73/863.61; 122/488
[58] Field of Search ............... 137/3, 89, 599; 122/34, 122/488; 55/36, 52, 55, 189, 199; 73/61.1 R, 863.03, 863.61; 374/42

[56] References Cited

U.S. PATENT DOCUMENTS

| | | |
|---|---|---|
| 1,999,740 | 4/1935 | Schmidt . |
| 2,074,883 | 3/1937 | Ziebolz . |
| 2,225,798 | 12/1940 | Price .................................. 73/863.03 |
| 2,387,717 | 10/1945 | Clarkson ........................... 374/42 X |
| 2,388,669 | 11/1945 | Baker . |
| 3,100,395 | 8/1963 | Morley .................................. 374/42 |
| 3,318,074 | 5/1967 | Keller . |
| 3,496,991 | 2/1970 | Barnd . |
| 3,633,344 | 1/1972 | Blank .................................. 122/488 X |
| 3,812,030 | 5/1974 | Clay .................................. 137/3 X |
| 3,844,304 | 10/1974 | Boothe . |
| 4,144,804 | 3/1979 | O'Keefe et al. ........................... 137/3 |
| 4,160,652 | 7/1979 | Martin et al. . |

OTHER PUBLICATIONS

"Two Phase Annular Flow Stream Division in a Simple Tee", A. E. Fonda and E. Rhodes, Transactions of the Institute of Chemical Engineering, 1974, vol. 52, pp. 354-360.

"Two Phase Flow Splitting at a Pipe Tee", R. C. Hong, Journal of Petroleum Technology, vol. 30, No. 2, Feb. 1978.

Primary Examiner—Martin P. Schwadron
Assistant Examiner—Stephen M. Hepperle
Attorney, Agent, or Firm—David H. Vickrey

[57] ABSTRACT

A method and apparatus for diverting into a branch line a portion of a gas-liquid flow stream from a two-phase flow trunk line. Each of two or more takeoff pipes withdraw a two-phase portion of the trunk line flow stream and transmit it to a single common branch line. The takeoff pipes are oriented to produce branch line flow of predetermined quality. The quality of branch line flow may be monitored and control valves positioned in one or more takeoff pipes and in the branch line to facilitate branch line flow of variable quality and rate.

5 Claims, 1 Drawing Figure

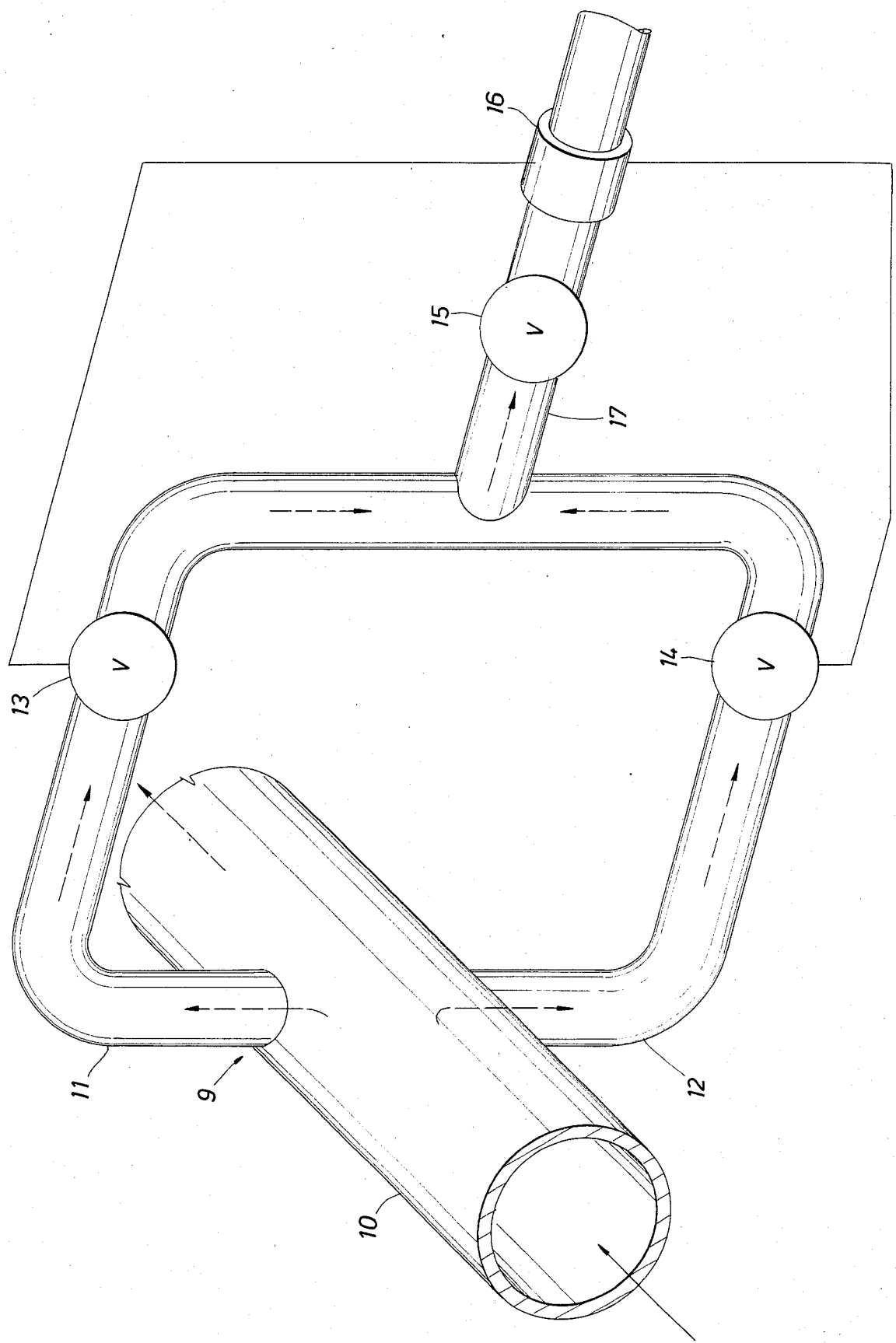

METHOD AND APPARATUS FOR SPLITTING TWO-PHASE FLOW AT PIPE TEES

FIELD OF THE INVENTION

This invention relates to methods and apparatus for splitting the flow of two-phase fluid mixtures being transported in a pipeline. This invention more particularly relates to methods and apparatus for diverting steam-liquid water flow from a trunk line into a branch line.

DESCRIPTION OF THE PRIOR ART

Pipe tees are extensively employed in pipeline networks used to transport two-phase fluid mixtures. It has long been known that the quality (the ratio of the mass of a gas component to the total mass of both gas and liquid components) of a two-phase fluid usually changes during splitting of the flow at a pipe tee. In fact, the quality of the various downstream branch flow streams in such networks may often be drastically changed, causing operation in unintended flow regimes because of liquid buildup or causing certain branches to be bypassed or to become inoperative.

A related problem has been observed in natural gas transmission networks. Frequently, liquid hydrocarbon condensates appear at some natural gas delivery stations while at other stations, the incoming natural gas remains relatively dry. Excessive condensate content can impair the operation of gas compressors in such networks, and a variety of complex schemes for completely separating gas from liquid have been proposed to solve this problem (see e.g., U.S. Pat. No. 4,160,652 (1979) to Martin, et al). The requirement of complete phase separation, for example, to allow separated liquids to bypass a gas compressor, mandates that such schemes be complex and cumbersome.

These complex schemes are generally unsuitable solutions to the problem involved in diverting a portion of a flowing two-phase fluid without complete separation into gas and liquid components. Such flow-splitting problems have been particularly significant in oil field steam stimulation projects involving the transport of wet steam from a common generator for injection into two or more wells. In such projects, subterranean reservoirs of viscous hydrocarbons are heated by injection of a steam-liquid water mixture. The wet steam delivery networks employing traditional pipe tees often fail to distribute steam of sufficiently high quality to some of the wells served by a common steam generator. Injection of low quality steam or hot liquid water may be ineffective because sufficient heat cannot thereby be transferred to the reservoir. This is because liquid water has a heat content much less than that of gaseous steam at the same temperature. Thus, the large extra amount of latent heat released when steam is condensed in such a reservoir is unavailable when liquid water rather than steam is injected.

Several factors affect the difference in quality between the flow upsteam and downsteam from a pipe tee. The most important of these factors include the velocity of flow, the angle between the incoming trunk line and the branch line, the orientation of the branch line relative to the horizontal plane, and the ratio of the volume of incoming flow to that of flow diverted into the branch line.

The problems of maintaining approximately constant quality when two-phase flow is split at a pipe tee have been recognized, but the proposed solutions are too restrictive. Frequently, these prior solutions require fixed relative flow rates in combination with fixed relative orientation of main trunk line and branch line, for example, constraining the flow system to the horizontal plane. Thus, it has been suggested in Hong, K. C. "Two-Phase Flow Splitting at a Pipe Tee", Journal of Petroleum Technology, vol. 30, no. 2, Feb. 1978, pp. 290-296, that where all flow streams are horizontal in the vicinity of the tee, and where the incoming stream is perpendicular to both outgoing streams, and on the further condition that at least 15% of the flow is withdrawn in each downstream branch, the quality of flow in the upstream and both downstream branches will be roughly equal.

Alternate proposed solutions for the case in which branch flow is diverted vertically upward from a horizontal trunk line have been suggested in Fouda, A. D. and Rhodes, E., "Two-Phase Annular Flow Stream Division in a Simple Tee", Transactions of the Institution of Chemical Engineers, vol. 52, 1974, pp. 354-360. The authors there suggest the insertion of a vertical baffle in the bottom of the trunk line opposite the branch line, or the positioning of a homogenising orifice in the trunk line immediately upstream from the branch line.

Problems still exist with all previously suggested approaches for splitting two-phase fluid flow, in particular for splitting wet steam flow. On one hand, complete phase separation techniques (such as those for diversion of liquid condensates around gas compressors in natural gas pipelines) cannot feasibly be applied in general because they are very complex, cumbersome, and expensive. On the other hand, the simpler prior art solutions that are appropriate for a limited class of wet steam splitting applications, are much too restrictive in terms of relative flow rates, main trunk line and branch line orientation, and ability to adjust branch flow quality.

SUMMARY OF THE INVENTION

The present invention is a method and apparatus capable of diverting two-phase flow of variable quality into a branch line, without a phase separation step, and independently of the relative orientation of trunk and branch lines. The method utilizes multiple takeoff pipes, each of which withdraws a two-phase portion of the incoming trunk line flow stream and delivers that portion to a single common branch line. In the preferred embodiment, only two takeoff pipes are employed. Each takeoff pipe is to be oriented substantially perpendicularly to the incoming trunk line flow stream at its point of intersection with the trunk line. The flow in at least one takeoff must be oriented generally downward and the flow in at least one other takeoff must be oriented generally upward.

The quality of flow through a takeoff depends on its orientation relative to the horizontal plane. All else being equal, flow through a takeoff oriented vertically downward will always be of lower quality than flow through a takeoff oriented vertically upward. Thus, branch line flow of a wide range of quality may be obtained by orienting the takeoffs generally vertically and controlling the relative flow rate through each takeoff. By positioning a control valve to regulate flow rate in one or more takeoff pipes, the quality of branch line flow may readily be varied.

The present invention provides a simple method and apparatus for diverting two-phase flow at variable quality into a branch line without a phase-separation step and without significant energy loss.

BRIEF DESCRIPTION OF THE DRAWING

The drawing is a schematic view of an illustrative embodiment of a method and apparatus constructed according to this invention in which two vertical, diametrically opposed takeoff pipes are employed.

DETAILED DESCRIPTION OF THE INVENTION

The present invention utilizes to advantage the fact that steam of differing quality flows through a takeoff pipe depending on its orientation relative to the horizontal plane. This phenomenon occurs at pipeline branch points where a takeoff pipe extends radially outward from the axis of a trunk line (that is, substantially perpendicularly to the axis of the truck line). By practicing this invention, steam of a given quality flowing in a trunk line can be diverted into a branch line without significant energy loss and at a desired quality. The drawing illustrates a preferred embodiment of the invention in which two takeoff pipes, one oriented generally upward and the other generally downward, divert flow radially outward from a trunk line. The two takeoffs need not be oriented exactly vertically. In certain cases, where the truck line orientation substantially deviates from horizontal, the takeoffs should not be oriented exactly vertically. Each takeoff removes a portion of the steam having a different quality. The two takeoff streams are the combined to form a branch stream having the desired quality. While more than two takeoffs may be employed, it is contemplated that for ease of manufacturing, a double takeoff apparatus will be preferred for most applications.

Referring to the drawing, the liquid-gas two-phase flow arrives at the branch point 9 in incoming trunk pipeline 10. A two-phase portion of the incoming trunk flow is withdrawn in each of the two takeoffs, takeoff pipe 11 and takeoff pipe 12. The two takeoff flow streams are combined to produce a single outgoing flow stream in branch pipeline 17. A control valve 15 is positioned in branch line 17 for regulating the flow rate through branch pipeline 17.

As illustrated schematically by the drawing, takeoff pipe 11 and takeoff pipe 12 are oriented substantially radially outward from trunk line 10 near their respective intersections with trunk line 10. Takeoff pipe 11 is oriented generally upward and takeoff pipe 12 is oriented generally downward. It is preferred that takeoffs 11 and 12 be oriented vertically upward and downward, respectively, so far as is possible subject to the constraint that they both be substantially perpendicular to trunk line 10. Vertical diametrically opposed takeoff pipe orientation is preferred since it facilitates adjustment of branch flow quality over the widest possible range. Vertical takeoff orientation ensures that for all values of flow rate in takeoff pipe 12 the two-phase flow through takeoff pipe 12 will be of lower quality than incoming two-phase flow in trunk line 10 and for most values of flow rate in takeoff pipe 11, the two-phase flow through takeoff pipe 11 will be of higher quality than the incoming flow in truck line 10. When the two takeoff flow streams are combined to produce a single branch flow stream, the quality of that branch flow will be in the range defined by the average of the qualities of each takeoff flow stream. Thus, vertical takeoff orientation not only facilitates adjustment of branch flow quality over a wide range, given a fixed branch line flow rate, but permits flexible adjustment over the widest possible range of branch line flow rates.

The relative flow rates of the takeoff streams can be preset by employing takeoff pipes having appropriate relative diameters. These relative diameters are estimated by considering that the desired branch line quality for a given branch line flow rate is the average of the known takeoff flow qualities weighted by the respective takeoff flow rates and that the relative flow rates through the takeoffs are proportional to the relative cross-sectional areas of the takeoffs. To permit adjustment of relative flow rates and takeoff flow qualities, control valves 13 and 14 are inserted in takeoff pipe 11 and takeoff pipe 12 respectively. However, for many applications, only one control valve, in either takeoff pipe 11 or 12, will provide sufficient relative flow rate and quality variability. Since the flow through branch line 17 is the sum of the two takeoff flow streams, adjustment of the relative flow rates through the takeoffs will vary the quality of the branch flow.

It is preferred that the quality of branch flow will be continuously monitored by insertion of a suitable quality meter 16 in branch line 17. One such quality meter is discussed in pending application Ser. No. 435,817 by Mohammed A. Aggour and Sanjoy Banerjee entitled "Apparatus and Method for Determining the Hydrogen Content of a Substance". Means for automatically adjusting control valve 13 and control valve 14 so as to produce branch line flow of preselected quality may optionally be included. Such means, triggered by the output of quality meter 16, may include microprocessor-controlled electronic circuitry which comprises means for detecting the output of quality meter 16, comparing that output with a predetermined reference value representing the desired branch line flow quality, and applying a signal when the quality meter output differs from the predetermined reference value to activate the flow rate adjustment mechanism of one or both of control valves 13 and 14.

EXAMPLES

The present invention was tested on a pipeline network embodying the method and apparatus thereof. An air-water mixture was diverted from a horizontal trunk line into a horizontal branch line having an inner diameter of 2" by means of two vertical, diametrically opposed takeoff pipes having relative inner diameters in the range ½" to 1". In the annular flow regime, branch flow having equal quality to that of the trunk flow stream was achieved by employing an upward-oriented takeoff 1" in diameter and a downward-oriented takeoff ½" in diameter. In the slug flow regime, branch flow having equal quality to that of the trunk flow was achieved using upward and downward; takeoffs having diameters 1" and ¾" respectively.

These results have been extrapolated to oil field steam stimulation project conditions. There, typically, wet steam having quality in the range 50% to 90% is transported through a trunk line at a pressure of 2000 psi and a temperature of 636° F. Where horizontal trunk line and branch line inner diameters are 16" and 8" respectively, and vertical, diametrically opposed takeoffs are employed, identical branch flow and trunk flow quality can be achieved using upward and downward takeoff diameters of 8" and 3 ¼" respectively. Under similar conditions, such equal quality flow splitting can be achieved where trunk line diameter, branch line diameter, upward takeoff diameter, and downward takeoff diameters are respectively 12″, 6″, 6″, and 2 ½″ or 10″, 5″, 5″, 2″. To permit adjustment of relative takeoff flow rates in oil field steam stimulation applications, a high pressure control valve should be positioned in at least one takeoff. A suitable control valve may be selected from those models commercially available. For example, Gray Tool Company Model D Graygate ® valves would be suitable for many oil field applications.

Thus, the present invention provides a method and apparatus for diverting a two-phase fluid flow stream from a trunk line to a branch line, without substantial energy loss and with a desired quality. The invention is capable of achieving such flow diversion without a phase separation step, and is independent of the relative orientation of trunk and branch lines.

Various modifications and alterations in the practice of this invention will be apparent to those skilled in the art without departing from the scope and spirit of this invention. Although the invention was described in connection with a specific preferred embodiment, it should be understood that the invention as claimed should not be unduly limited to such specific embodiment.

What is claimed is:

1. A process for diverting a stream of a flowing fluid having at least one gas phase and at least one liquid phase from a pipeline into a branch line, which comprises:

(a) withdrawing a first portion of said fluid from said pipeline in a generally upward and radially outward direction, and at a first flow rate;
   (b) simultaneously withdrawing a second portion of said fluid from said pipeline in a generally downward and radially outward direction, and at a second flow rate;
   (c) combining said first and second portions into said branch line; and
   (d) regulating said first and second flow rates so that said first and second portions combine to form a stream of fluid in said branch line at a predetermined, desired quality.

2. The process according to claim 1 wherein said fluid is wet steam.

3. The process of claim 1 wherein said fluid has a given quality in said pipeline and said predetermined, desired quality is substantially equivalent to said given quality.

4. The process of claim 1 wherein step (d) further includes positioning a control valve in at least one of said first and second flow portions and adjusting said control valve to adjust said first flow rate relative to said second flow rate.

5. The process of claim 4 further comprising the steps of measuring the quality of said stream flowing through said branch line; comparing said measured quality with a reference value representing said predetermined desired quality; and automatically adjusting at least one of said first and second flow rates to make said measured quality substantially equal to said reference value.

* * * * *